United States Patent [19]

Pizzuti et al.

[11] 4,312,582

[45] Jan. 26, 1982

[54] EXPOSURE CONTROL AND FOCUSING APPARATUS FOR USE IN A PHOTOGRAPHIC CAMERA

[75] Inventors: Donato F. Pizzuti, Lynnfield; Charles W. Triggs, Marshfield, both of Mass.

[73] Assignee: Polaroid Corporation, Cambridge, Mass.

[21] Appl. No.: 240,011

[22] Filed: Mar. 3, 1981

[51] Int. Cl.$^3$ .................. G03B 13/02; G03B 7/14; G03B 15/03; G03B 9/02

[52] U.S. Cl. ...................... 354/196; 354/27; 354/149; 354/271

[58] Field of Search ............. 354/230, 271, 235, 231, 354/139, 149, 195, 196, 26, 27

[56] References Cited

U.S. PATENT DOCUMENTS

| | | | |
|---|---|---|---|
| 1,771,844 | 7/1930 | Eilenberg et al. | 354/270 X |
| 2,917,984 | 12/1959 | Faulhaber | 354/196 |
| 3,305,294 | 2/1967 | Alvarez | 351/169 |
| 3,373,671 | 3/1968 | Jakob | 354/149 |
| 3,507,565 | 4/1970 | Alvarez et al. | 351/17 |
| 3,583,299 | 6/1971 | Land | 354/35 |
| 3,583,790 | 6/1971 | Baker | 350/184 |
| 3,617,116 | 11/1971 | Jones | 351/177 |
| 3,721,169 | 3/1973 | Johnson | 354/149 |
| 3,750,543 | 8/1973 | Eloranta et al. | 354/27 |
| 3,903,218 | 9/1975 | Humphrey | 264/1 |
| 4,167,316 | 9/1979 | Johnson et al. | 354/195 X |
| 4,188,103 | 2/1980 | Biber et al. | 354/27 |

FOREIGN PATENT DOCUMENTS 998191 7/1965 United Kingdom ............... 350/184

*Primary Examiner*—Donald A. Griffin
*Attorney, Agent, or Firm*—Francis J. Caufield

[57] ABSTRACT

Photographic camera apparatus for use with a camera having an optical path along which film can be positioned for exposure. The apparatus comprises a scanning type shutter blade arrangement displaceable during an exposure cycle to define a progressively increasing aperture in alignment with the optical path to facilitate film exposure and a variable focus optical system coupled via an epicyclic gear train with the shutter blade arrangement such that the focus of the optical system is continuously changed in response to displacement of the shutter blade arrangement. The apparatus is structured so that the optical system focuses for predetermined subject distances as predetermined sizes of the shutter blade arrangement aperture occur.

16 Claims, 14 Drawing Figures

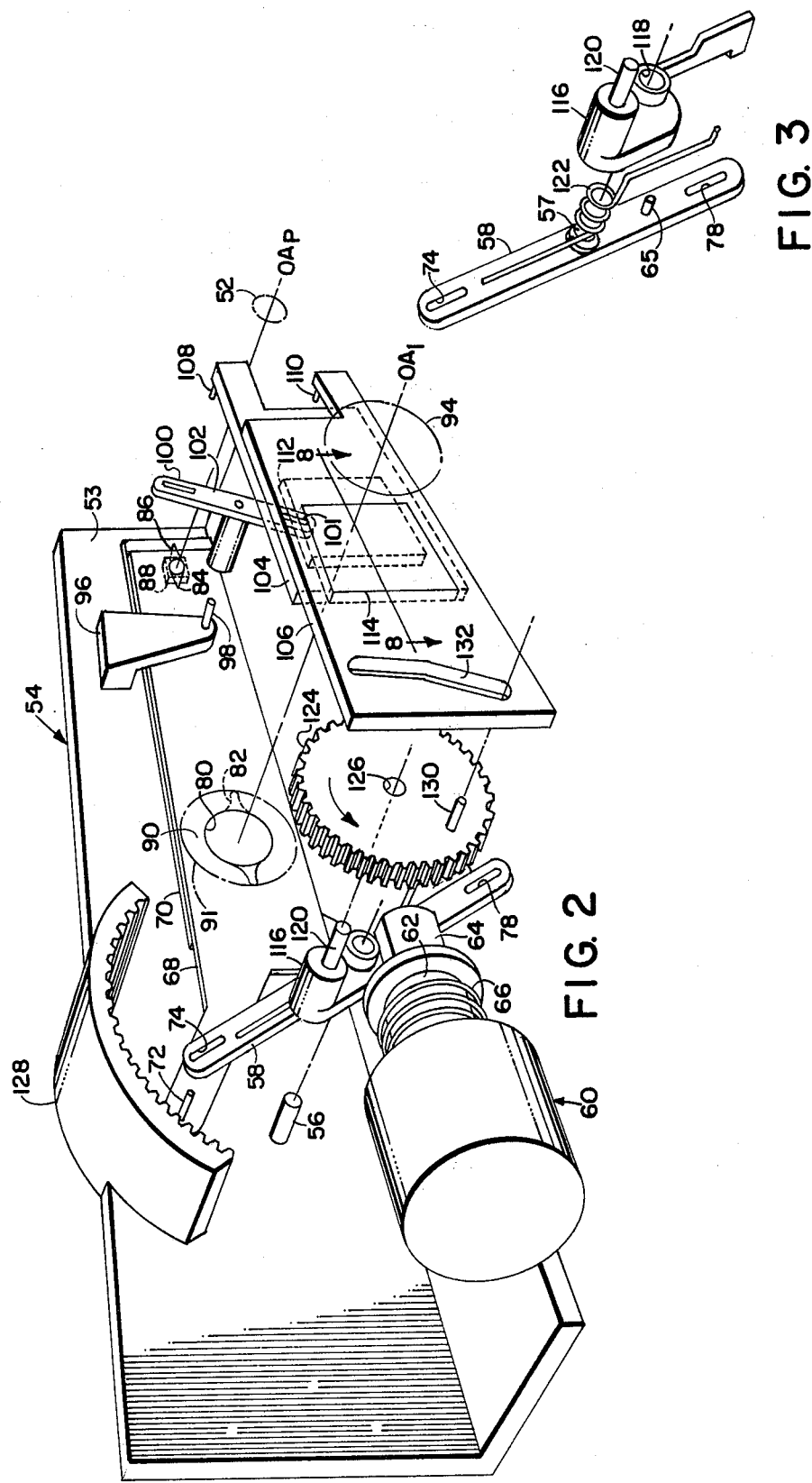

EXPOSURE CONTROL AND FOCUSING APPARATUS FOR USE IN A PHOTOGRAPHIC CAMERA

BACKGROUND OF THE INVENTION

1. Field of the Invention

This invention in general relates to photography and in particular to a scanning type shutter blade arrangement and a variable focus optical system coupled together such that the optical system focuses for prodetermined subject distances as the shutter blade arrangement provides different aperture sizes to facilitate exposure.

2. Description of the Prior Art

Camera exposure control systems employing scanning type shutter arrangements are well-known in the photographic art as is shown in the disclosures of, for example, U.S. Pat. Nos. 3,762,299; 3,972,058; and 4,047,190. Typically, the scanning type shutter comprises a pair of opaque blade elements which are mounted for counter-reciprocating motion with respect to one another. Each blade element has a primary aperture of predetermined size and shape located so that, when the blade elements are in one position, the blade element apertures are misaligned and the camera light path is blocked. When the blade elements are moved from their blocking position, however, the blade element apertures progressively overlap one another and become aligned with the camera optical path to define a varying sized exposure aperture. Displacement of the blade elements is usually effected by a solenoid and spring and/or latch arrangement under the control of suitable electronics.

The blade elements also may be initially arranged so that the camera optical path is fully unblocked to facilitate reflex viewing through the camera taking lens and thereafter the camera optical path can be closed and reopened during an exposure cycle or, alternatively, the blade elements can simply unblock the camera path from a fully blocking arrangement during an exposure cycle.

Under natural lighting conditions, the exposure interval of the scanning type shutter blade arrangement, i.e., the period of time during which the blade element apertures overlap to define the variable exposure aperture, is usually regulated by a scene light integrating arrangement which evaluates scene brightness and commands the solenoid to drive the blade elements to return them to their blocking position after they have begun opening to thereby terminate film exposure.

Scanning type shutter blade arrangements have also been adapted in a variety of ways to operate in conjunction with artificial light sources which are utilized to illuminate a scene when the natural available light is too low for adequate exposure.

One of the ways in which the scanning type shutter blade arrangements has been adapted for flash operation to provide proper exposure control is shown in U.S. Pat. No. 3,750,543. Here, a second solenoid driven arrangement inserts a stop within the locus of travel of the blade elements to arrest their movement to define a flash exposure aperture preselected in correspondence with the state of focus of the camera objective lens. The stop is positioned by a cam arrangement which is coupled to the focusing movement of the camera objective lens. This type of arrangement is referred to as "follow focus" flash exposure control because the size of the exposure aperture is set in accordance with the state of focus of the camera lens and hence the distance by which the subject is separated from the camera.

Camera objective lenses frequently used in the above-noted type of follow focus flash exposure control arrangements are frequently variable focal length lenses of the type which have their focal length continuously changed by manually changing the axial air spacing between their elements. However, focus of this type of lens can also be adjusted automatically through the use of automatic ranging apparatus such as the well-known ultrasonic ranging systems described, for example, in U.S. Pat. No. 4,167,316.

Another type of adjustable optical system known to be used in connection with scanning shutter blade arrangements is described in U.S. Pat. No. 4,167,316. Here, a prime lens and a lens disk comprise the optical system. The lens disk alters the optical power of the prime lens depending on the position of the lens disk, which is automatically controlled by a sonar ranging arrangement. In this manner proper focus of the optical system is achieved for preselected ranges of subject distances.

Other types of known variable focal length optical systems are disclosed in U.S. Pat. Nos. 3,305,294 and 3,583,790. In these disclosures, focal length changes are effected by displacing a pair of specially configured optical refracting plates in opposite directions transverse to their optical axes.

It is a primary object of the present invention to provide a scanning type shutter blade arrangement and a variable focus optical system which cooperate such that the optical system focuses for predetermined subject distances as the shutter blade arrangement provides different sized apertures to facilitate film exposure.

Another object of the present invention is to provide a camera exposure control system in which the motion of a scanning type shutter blade arrangement is utilized to set the focus of a variable focal length optical system of the type wherein focal length changes are effected by lateral displacement of a pair of specially configured optical refracting plates.

Another object of the present invention is to provide a camera flash exposure control system in which an exposure aperture and the focus of a lens are properly set in a synchronous manner for predetermined subject distances.

It is another object of the present invention to provide an epicyclic gear train by which the motion of a scanning type shutter blade arrangement can be transmitted in a relative manner to a variable focus optical system to set the focus of the optical system for predetermined object distances as the shutter blade arrangement provides predetermined exposure aperture sizes at predetermined times during an exposure cycle.

Other objects of the invention will in part be obvious and will in part appear hereinafter. The invention accordingly comprises the apparatus possessing the construction, combination of elements and arrangement of parts which are exemplified in the following detailed disclosure.

SUMMARY OF THE INVENTION

This invention relates to photographic camera apparatus for use in a camera of the type having means for facilitating the positioning of film in a plane for exposure and an optical path along which light from a scene can travel to expose the film.

The apparatus of the invention comprises blade apparatus and means for mounting the blade apparatus for displacement between a first arrangement in which the blade apparatus blocks scene light from traveling along the camera optical path thereby precluding scene light from reaching the film plane and a second arrangement in which the blade apparatus unblocks the camera light path. The blade apparatus is structured to define an aperture, aligned with the camera optical path, which varies in size in a predetermined manner during displacement of the blade apparatus between its first and second arrangements.

Also included in the invention are drive means actuable for displacing the blade apparatus between its first and second arrangements to define an exposure interval.

Variable focus optical meaans are provided and are structured to continuously focus scene light from a predetermined range of subject distances onto the film plane. The optical means comprises a pair of optical elements having refractive surfaces configured such that changes in focus are effected by displacing the elements relative to one another in a direction transverse to their optical axes.

Also provided are means for mounting the optical refractive elements for movement relative with respect to one another transverse to the camera optical path and between a first arrangement corresponding to the first arrangement of the blade apparatus and a second arrangement corresponding to the blade apparatus second arrangement.

An epicyclic gear train is provided for driving at least one of the optical elements in response to displacement of the blade apparatus so that the optical elements change focus in a predetermined manner during displacement of the blade apparatus between its first and second arrangements. The epicyclic gear train is structured so that the optical elements move in correspondence with the blade apparatus to focus at predetermined subject distances for predetermined sizes of the blade apparatus aperture.

In a preferred embodiment of the invention, the blade apparatus comprises a pair of elongated, thin opaque blade elements which are generally rectangular in shape. The blade elements are mounted for counter-reciprocating motion with respect to one another and each has an aperture of predetermined size and shape therein located so that, when the blade apparatus is in its first arrangement, the blade apertures are misaligned with one another and opaque portions of the blade elements block the camera light path. As the blade apparatus is displaced between its first and second arrangements, the blade element apertures progressively overlap one another and become aligned with the camera optical path to define the varying sized aperture in alignment with the camera light path.

The preferred means for mounting the optical refracting elements comprises another pair of thin, elongated blade elements also mounted for counter-reciprocating motion with respect to one another in planes generally parallel with the planes in which the blade apparatus blade elements move and wherein the optical refracting elements are fixedly mounted on the other blade elements for movement therewith.

The preferred epicyclic gear train of the invention comprises a gear segment of predetermined configuration fixedly mounted with respect to the blade apparatus and the optical elements and a circular gear having its center mounted with the blade apparatus mounting means for movement therewith and structured so that the circumferential teeth thereof are engaged with the fixed gear segment to travel around the circumference of the fixed gear segment as the blade apparatus is displaced between its first and second arrangements. The circular gear includes an eccentric pin for facilitating movement of at least one of the optical elements to change the focus of the optical elements.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment when read in connection with the accompanying drawings wherein like numbers have been employed in the different figures to denote the same parts and wherein:

FIG. 2 is an enlarged, exploded perspective view of the invention;

FIG. 3 is an enlarged, exploded perspective view of part of the invention shown in FIG. 2;

FIG. 10 being taken generally along line 10—10 in FIG. 4; and FIG. 9 being taken along a section line 10—10 in FIG. 4 with the parts in different positions;

DESCRIPTION OF THE PREFERRED EMBODIMENT

Figure 1:
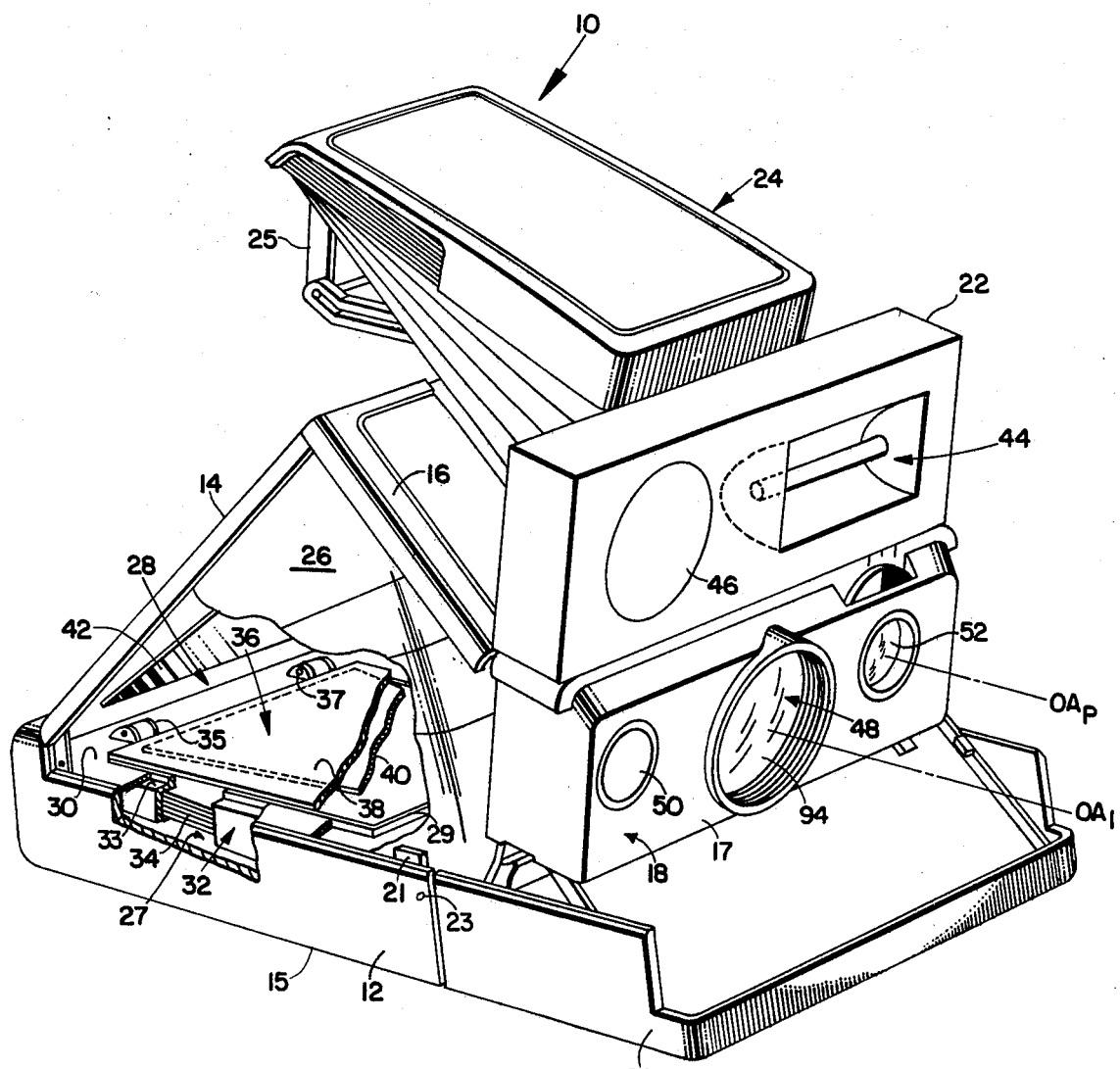
FIG. 1 is a perspective view, with parts broken away, of a photographic camera in which the invention is incorporated.

Referring now to FIG. 1, there is shown a photographic camera 10 in which the preferred embodiment of the present invention is incorporated. The camera 10 may be generally characterized as a highly-automatic, folding, reflex-type which, in a manner to be described hereinafter, has a distinct ambient exposure mode of operation and a distinct flash exposure mode of operation in which an artificial light source is used to illuminate a scene to be photographed.

In general, the camera 10 has structural features similar to those of the camera disclosed and described in considerable detail in U.S. Pat. No. 3,714,879 issued to Edwin H. Land et al. on Feb. 6, 1973 and entitled "Reflex Camera". However, the camera 10 specifically differs from the Land et al. camera, supra, by virtue of a novel exposure control and lens focusing system which comprises the subject matter of the present disclosure and which will be particularly pointed out and described in considerable detail hereinafter. Therefore, for a more detailed description of features of the camera 10 which are identified as being well-known, reference may be had to the above-mentioned U.S. Pat. No. 3,714,879 or to other U.S. patents which will be specifically identified where appropriate.

In FIG. 1, the camera 10 is shown in a fully extended operative condition in which it can be seen to comprise a plurality of housing sections including a base housing section 12, a rear housing section 14, an upper housing section 16, and a shutter housing section 18 which are coupled to one another in a well-known manner for relative movement with respect to one another. The four housing sections, 12-18, thus arranged, cooperate to form a four-sided articulated structure or support frame for receiving and supporting a film container or cassette and components of the camera exposure and optical system. Structurally arranged in this manner, the four housing sections, 12-18, provide the camera 10 with a foldable housing which, in effect, operates as a four-bar linkage system that is geometrically configured to define a predetermined space between them when the camera 10 is erected, and are further configured and arranged with respect to one another to provide the camera 10 with a compact folded shape (not shown) to facilitate its transport and storage.

The camera 10 is maintained in its fully-extended position in a well-known manner by the provision of an erecting link (not shown). The erecting link locks the housing sections, 12-18, in their predetermined spatial relationship so that the geometric integrity of the camera 10 is preserved while in its extended position. The erecting link may be manually moved in a well-known manner to interrupt the locking relationship between the housing sections, 12-18, in order to facilitate folding of the camera 10.

Secured to the interior walls of the housing sections, 12-18, is a thin-walled, opaque, flexible envelope 26 which is configured and arranged for movement in correspondence therewith between a collapsed state (not shown) corresponding to the folded position of the camera 10 in which the envelope 26 assumes a compact shape to facilitate folding and the extended state as illustrated in FIG. 1. When the camera 10 is extended, the envelope 26 is also extended to define, in cooperation with the housing sections, 12-18, a light-tight exposure chamber or envelope which is generally designated at 28 and which, as will be seen, surrounds the optical path of the camera 10. The opaque envelope 26 is secured to the housing sections, 12-18, in a light-tight manner by well-known methods and has appropriate openings therein to permit light to travel along the optical path of the camera 10 while excluding the entry of unwanted ambient light into the camera exposure chamber 28. A more detailed description of the material composition and method of attachment of the envelope 26 to the various housing members of the camera 10 is provided, for example, in U.S. Pat. No. 3,682,068 issued to Frank M. Steiger on Aug. 8, 1972 and entitled "Light Envelope".

Housing section 12 includes a film cassette receiving chamber generally designated at 27. The film cassette receiving chamber 27 is formed in a well-known manner between a bottom wall 15 and an apertured generally planar top wall 30 spaced away from the bottom wall 15 in a generally parallel relationship. Both the bottom wall 15 and the top wall 30 form part of the camera base housing section 12.

The film cassette receiving chamber 27 is configured to receive a film cassette 32 which is preloaded with a plurality of self-processable type film units 34 that are arranged in stacked relationship within the cassette 32. The film cassette 32 includes a forward wall 33 having an aperture therein that is defined by an upstanding rib 29 surrounding the aperture. The aperture surrounded by the rib 29 defines a generally rectangular light-transmitting section in the forward wall 33 that is substantially coextensive with the photosensitive area of each of the film units 34. Located on the inside of the base housing section bottom wall 15 is a resilient spring (not shown) which contacts the bottom of the film cassette 32 to urge the film cassette forward wall 33 against the bottom surface of the apertured wall 30 so that the film cassette upstanding rib 29 is telescopically received within the aperture in the camera wall 30.

In the foregoing manner, the camera 10 is provided with means for facilitating the positioning of film in a plane for exposure. An example of a film cassette of the type represented by the cassette 32 is disclosed and described in considerable detail in U.S. Pat. No. 3,872,487 issued to Nicholas Gold on Mar. 18, 1975 and entitled "Photographic Film Assemblage And Apparatus".

The front housing section 20, which extends forwardly of the base housing section 12, is pivotally mounted with respect to the base housing section 12 about a pair of pivots 23 (only one shown). The front housing section 20 is retained in its position illustrated in FIG. 1 via a well-known latch 21. When the latch 21 is depressed, it releases the front housing section 20 in a well-known manner for clockwise rotation about the pivots 23 to facilitate loading the film cassette 32 into the film receiving chamber 27. When in its latched position as illustrated in FIG. 1, the front housing section 20 functions to retain the film cassette 32 within the base housing section 12 and also positions a pair of processing rollers (not shown) to sequentially transport and simultaneously process, in a well-known manner, the film units (34) of the film cassette 32 after they have been photoexposed in a manner to be described.

The shutter housing section 18 comprises a multiapertured front cover 17 which is attached to an L-shaped base block 54 (see FIGS. 2 and 4) which together, among other things, cooperate to provide a protective enclosure in which is disposed the various components of the camera 10 including those of the exposure control and optical system of the present invention. In registration with the centrally disposed aperture of the shutter housing section front cover 17 is the optical system of the invention which is only partially shown in FIG. 1 but is designated generally at 48. The optical system 48 is arranged along an optical axis, $OA_l$, thereof.

To the left of the optical system 48 there is, in registration with another aperture of the front cover 17, a camera actuator button 50 which operates in a well-known manner to initiate camera operations. To the right of the optical system 48, there is an optical element 52 arranged along an optical axis, $OA_p$, thereof. The purpose of the optical element 52 is to collect radiation from a scene to be photographed and direct such radiation onto a photodetector 88 (see FIG. 2) which is located in a vertically extending wall 53 of the L-shaped base block 54. The photodetector 88 is positioned along the optical axis, $OA_p$, and behind the optical element 52, to receive scene radiation therefrom.

Figure 4:
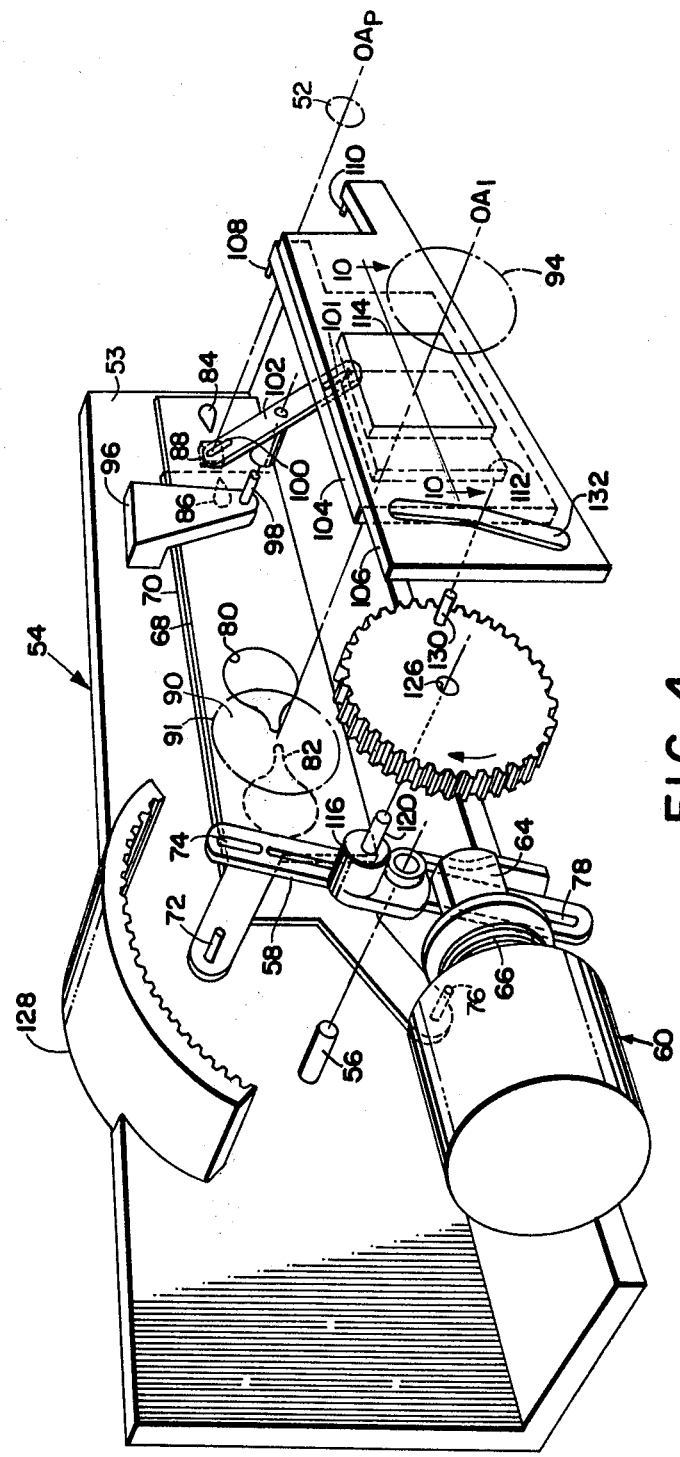
FIG. 4 is a view similar to FIG. 2 except that certain of the parts shown in FIG. 2 are positioned differently in FIG. 4.

Referring now to FIGS. 2, 3 and 4, it can be seen that the base block 54 operates to support a number of exposure control and optical components which form part of this invention.

Centrally disposed within the base block vertical wall 53 is an exposure or main aperture 91 which defines the maximum available exposure aperture through which light from a scene can enter the previously-described exposure chamber 28. Optically registered with the aperture 91 is a lens element 90. The lens element 90 in combination with another lens element 94, both of which are symmetrically arranged in a well-known manner along the optical axis, $OA_1$, define a doublet lens having a predetermined focal length designed to focus at a finite object distance and form part of the camera optical system 48. The other optical components that comprise the camera optical system 48 are a pair of optical refracting elements 112 and 114 which will be more fully described hereinafter. In general, however, the optical refracting elements 112 and 114 operate to provide a means for adding dioptric power to and subtracting dioptic power from the doublet lens previously described for purposes of focusing the camera optical system 48.

Referring again to FIG. 1, there is shown located within the exposure chamber 28 a reflex member 36 which is pivotally mounted about a pair of pivots, 35 and 37. Secured to the reflex member 36 is a trapezoidal-shaped mirror 40 which, when the reflex member 36 is in its position as illustrated in FIG. 1, overlies the film units 34 in the film cassette 32. The reflex member 36 additionally includes a Fresnelled surface 38 which faces upwardly into the exposure chamber 28 when the reflex member 36 is positioned as illustrated in FIG. 1. Located on the interior wall of the rear housing section 14 is a fixed mirror 42 that is positioned at a predetermined angle with respect to the camera optical system axis, $OA_1$. The reflex member 36 can be rotated about the pivots 35 and 37 in a well-known manner so that the Fresnelled surface 38 overlies the fixed mirror 42 and, when this occurs, the mirror 40 is slanted at a predetermined angle with respect to the film cassette 32 and the optical axis, $OA_1$, of the camera optical system 48. When in this position along the optical axis, $OA_1$, the trapezoidal-shaped mirror 40 operates to fold the optical axis, $OA_1$, of the camera optical system 48 so as to establish a folded optical path between the camera optical system 48 and a forwardmost one of the plurality of stacked self-processable film units 34 contained in the film cassette 32. With this optical arrangement, rays from a photographic scene, which emerge from the camera optical system 48 and pass through the exposure aperture 91 in base block 54, in a manner to be more fully described, can be reflected from the mirror 40 onto a forwardmost one of the film units 34 to expose it.

While the reflex member 36 is in its position covering the aperture in film cassette forward wall 33 and the aperture 91 is unobstructed, the camera 10 is provided in a well-known manner with a viewing mode by which a user may frame the subject matter of interest by directly observing the scene through the optical system 48 via a viewfinder assembly 24 which includes an eyelens 25 for this purpose. For a more detailed description of the structure of the reflex member 36, the viewfinder assembly 24, and the manner in which they cooperate, reference may be had to U.S. Pat. No. 3,783,764 issued to James G. Baker on Jan. 8, 1974 and entitled "Reflex Camera And Viewing Device" and U.S. Pat. No. 3,371,608 issued to Edwin K. Shenk on May 8, 1973 and entitled "Reflex Camera With Motor Drive".

As will be apparent to those skilled in the art, the camera optical system 48, in combination with the aperture in the film cassette forward wall 33 and the mirror 40, cooperate to provide the camera 10 with an angular field of view which defines the area in object space that can be imaged within the area bounded by the peripheral edges of the upstanding rib 29 that defines the photosensitive area of a film unit 34 that can be exposed.

In the foregoing manner, the camera 10 is provided with means for accommodating the positioning of photosensitive film in an exposure plane and means for defining an optical path along which scene light from within the camera field of view can be transmitted to expose film located in the exposure plane.

As seen in FIG. 1, the shutter housing section 18 has, vertically extending above it, a housing 22 which includes a well-known sonar transducer 46 that forms part of a well-known automatic ranging system which operates in a manner to be described and an electronic flash 44 for providing artificial illumination for scenes under low ambient lighting conditions.

Referring now to FIG. 2, it can be seen that the exposure control system of the camera 10 comprises a blade mechanism which includes two overlapping, opaque shutter blade elements 68 and 70 which are of the so-called "scanning aperture type". Provided in the blade elements 68 and 70 are, respectively, a pair of scene light-admitting primary apertures 80 and 82 which collectively define a progressive variation of effective primary aperture openings in accordance with longitudinal displacement of one of the blade elements with respect to the other blade element in a manner as is more fully described in the aforementioned U.S. Pat. No. 3,714,879. The apertures 80 and 82 are selectively shaped so as to overlap the aperture 91 in the base block vertical wall 53 thereby defining a gradually varying effective aperture size as a function of the position of the blade elements 68 and 70. Each of the blade elements 68 and 70 are additionally configured to have corresponding photodetector-sweep secondary apertures respectively shown at 84 and 86. Secondary apertures 84 and 86 may be configured in correspondence with the shapes of the scene light-admitting primary apertures 80 and 82. As is readily apparent, the secondary apertures 84 and 86 also move in correspondence with the primary apertures 80 and 82 to define a small secondary effective aperture for permitting scene light, which emerges from the lens element 52, to impinge upon the photodetector 88.

The ends of the blade elements 68 and 70, opposite the secondary apertures, 84 and 86, are pivotally connected to a walking beam 58 via respective pins 72 and 76 (also see FIG. 4) each of which is slidably engaged in a corresponding elongated slot designated at 74 and 78, respectively. Slots 74 and 78 are located near the distal ends of the walking beam 58. The walking beam 58, in turn, is disposed for rotation relative to the L-shaped base block 54 by means of a pivotal connection comprising a pivot pin 56 and a hub 57 (see FIG. 3) of the walking beam 58. The walking beam 58 may be pivotally retained with respect to the pivot pin 56 by any conventional means. The elongated slots 74 and 78 cooperate with their respective pins 72 and 76 to inhibit disengagement of the blade elements 68 and 70 during operation of the blade mechanism. Thus, the walking beam 58, the guide pins 72 and 74, and the blade elements 68 and 70 collectively define a blade apparatus with the means for mounting the blade apparatus for displacement.

Drive means for displacing the blade apparatus include a tractive electromagnetic device in the form of a solenoid 60 which is employed to displace the blades 68 and 70 with respect to each other and the L-shaped base block 54. The solenoid 60 includes an internally disposed cylindrical plunger 62 which retracts inwardly into the body of the solenoid 60 upon energization of the solenoid winding. The solenoid plunger 62 includes an end cap 64 at the outside end thereof together with a vertical slot or groove (not shown) within the end cap 64 for slidably engaging a pin 65 (see FIG. 3) which extends outwardly from the walking beam 58. In this manner, the solenoid plunger 62 is affixed to the walking beam 58 so that longitudinal displacement of the plunger 62 operates to rotate the walking beam 58 around the pivot 56 so as to appropriately displace the shutter blade elements 68 and 70. The drive means also includes a compression spring 66 which is sandwiched between the main body portion of the solenoid 60 and the plunger end cap 64. With this arrangement, the spring 66 continuously urges the end cap 64 against the walking beam pin 65 thereby also continuously urging the blade elements 68 and 70 toward a terminal arrangement, as best illustrated in FIG. 2, in which the primary apertures 80 and 82 of the blade elements 68 and 70, respectively, are aligned with one another to provide the largest opening in alignment with the aperture 91 in the base block vertical wall 53. Thus, with the spring arrangement described here, the blade mechanism of the invention is biased to continuously urge the blade elements 68 and 70 into an open orientation with respect to the camera optical path. This unblocking arrangement facilitates the viewing mode previously referred to.

In the present arrangement, the blade elements 68 and 70 are drawn from their open arrangement as illustrated in FIG. 2 to a closed arrangement which is illustrated in FIG. 4 in which both the optical path of the camera 10 and the light-transmitting path to the photodetector 88 are both blocked. Consequently, energization of the solenoid 60 causes the blade elements 68 and 70 to move toward a blocked arrangement which simultaneously precludes scene light from impinging on both the film units of the film cassette 32 and the photosensitive surface of the photodetector 88. Deenergization of the solenoid 60 causes the blade elements 68 and 70, via the compression spring 66, to assume their fully open position as best illustrated in FIG. 2. As is readily apparent, the blade elements 68 and 70 in displacing between the arrangements illustrated in FIGS. 2 and 4 operate to define intermediate aperture values over both the exposure aperture 91 in the base block vertical wall 53 and over the photodetector 88.

In the foregoing manner, the camera 10 is provided with a blade apparatus and means for mounting the blade apparatus for displacement between a first blocking arrangement in which the blade apparatus precludes scene light from being transmitted along the camera optical path and an unblocking arrangement in which the blade mechanism defines an aperture, aligned with the camera optical path, which varies in size in a predetermined manner during displacement of the blade apparatus between two terminal arrangements.

The optical refracting elements 112 and 114 are of the type more fully described in U.S. Pat. No. 3,305,294 issued to L. W. Alvarez on Feb. 21, 1967 and entitled "Two-Element Variable Power Spherical Lens" and in U.S. Pat. No. 3,583,790 issued to James G. Baker on June 8, 1971 and entitled "Variable Power, Analytic Function, Optical Component In the Form Of A Pair Of Laterally Adjustable Plates Having Shaped Surfaces, And Optical Systems Including Such Components".

These elements 112 and 114 may, in the manner described in the above-referenced U.S. Patents be provided with specially configured refractive surfaces which operate to effect focus changes, either using a pair of such elements by themselves or in combination with other optical systems, by displacing the elements relative to one another in a direction transverse to their optical axes. Thus the elements 112 and 114 operate by transverse motion across their own optical axes to provide a variable optical means structured to focus scene light from a predetermined range of subject distances onto a film plane.

The optical elements 112 and 114 are mounted in a pair of blade elements 104 and 106, respectively, which are geometrically similar to the blade elements 68 and 70. Each of the optical elements 112 and 114 is mounted in an aperture of its respective blade 104 or 106 that is dimensioned to receive a corresponding one of the optical elements 112 or 114. The blades 104 and 106, in a manner to be described, move in a counter-reciprocating fashion similar to the manner in which the blade elements 68 and 70 move. However, the blades 104 and 106 as will be seen are driven by the motion of the blade elements 68 and 70 via a coupling arrangement which transmits the movement of the blade elements 68 and 70 to the blade elements 104 and 106.

For purposes of providing the blade elements 104 and 106 with counter-reciprocating motion, the blade elements 104 and 106 are pinned to another walking beam 102 via a pair of pins 108 and 110, respectively, which, in turn, are slidably engaged by a pair of slots 100 and 101, respectively, formed in the distal ends of the walking beam 102. The walking beam 102 is pivotally connected to the L-shaped base block 54 via a support member 96 which cantilevers off the vertical wall 53 and overlaps the blade elements 68 and 70. Formed in the end of the support member 96 is a pivot pin 98 over which the hub of the walking beam 102 fits. The support member 96, thus shaped, also slidably retains the ends of the blades 68 and 70 so that they do not disengage from the front surface of the base block vertical wall 53.

The blades 104 and 106 are driven in counter-reciprocating fashion in response to the movement of an eccentric pin 130 which engages a cam slot 132 formed in one end of the blade 106. The eccentric pin is attached to a rotating gear 126 which, in turn, is mounted on an inertial member 116 via a pivot 120 (see FIG. 3). The inertial member 116, in turn, is pivotally mounted on the walking beam pivot 56 and is retained thereon in a well-known manner. A torsion spring 122 is provided intermediate the walking beam 58 and the inertial member 116 for purposes of continuously biasing the inertial member 116 in a clockwise sense against the walking beam 58 as shown in FIG. 3. The rotating gear 124 is engaged with a gear segment 128 which is fixedly attached to the base block vertical wall 53.

The general manner in which the motion of the shutter blade elements 68 and 70 is transmitted to the blades 104 and 106 to move the optical elements 112 and 114 transverse to the camera optical axis, $OA_1$, as the shutter blade elements 68 and 70 move between their unblocking arrangement shown in FIG. 2 and their blocking arrangement shown in FIG. 4, will now be described with reference to FIGS. 5–10.

Figure 8:
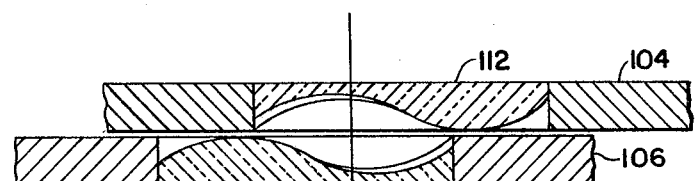
FIGS. 8, 9 and 10 are views showing parts of the invention in section-FIG. 8 being taken generally along line 8—8 of FIG. 2.
Figure 9:
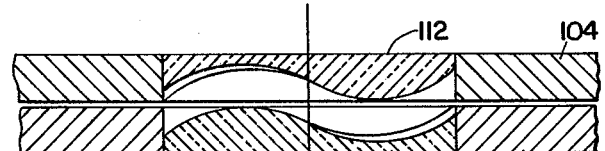
Figure 5:
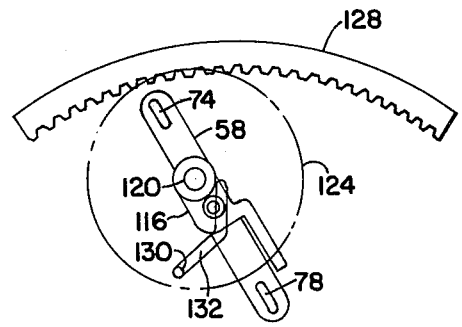

With the various parts of the invention arranged as shown in FIG. 2, the walking beam 58, the rotatable gear 124, the fixed gear segment 128 and the inertial member 116 are positioned as shown in FIG. 5. While in this position it can be seen that the eccentric pin 130, which is located on the gear 124, is positioned in the bottom end of the cam slot 132 formed in the end of the blade 106. In this configuration, the optical refracting elements 112 and 114 are disposed as shown in FIG. 8. As shown in FIG. 8, the surfaces of the optical elements 112 and 114 are arranged so that the combined optical power of the refracting elements 112 and 114 and the optical power of the doublet lens, which comprises the lens elements 90 and 94, causes the camera optical system 48 to focus at infinity to facilitate framing of the subject matter to be included in the picture.

Figure 10:
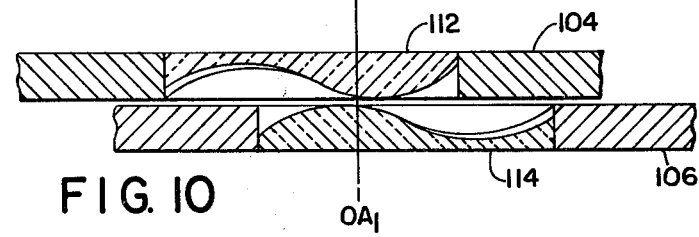
Figure 6:
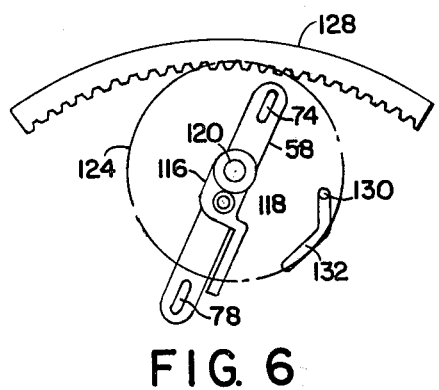
FIGS. 5, 6 and 7 are front views showing parts of the invention in different positions.
Figure 7:
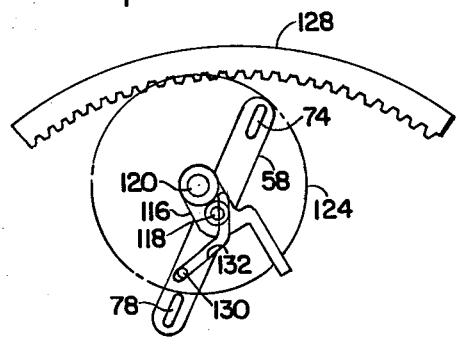

As will be recalled, the blade elements 68 and 70 move from their arrangement shown in FIG. 2 to their arrangement shown in FIG. 4 when the solenoid 60 is energized to terminate an exposure interval. Immediately after the solenoid 60 has been energized, the relative position of the parts of the invention is illustrated in FIG. 7. FIG. 7 shows the inertial member 116 temporarily decoupled from the walking beam 58. This occurs because the walking beam 58 under the applied force of the plunger 66 accelerates away from the inertial member 116. However, shortly after the walking beam 58 assumes its position shown in FIG. 7, the torque provided by the torsion spring 57 causes the inertial member 116 again to assume its position against the walking beam 58 thereby causing the rotating gear 124 to rotate in engagement with the gear segment 128 so that the eccentric pin 130 assumes the position at the top of the cam slot 132 as illustrated in FIG. 6. When the walking beam 58 and the inertial member 116 have assumed their positions shown in FIG. 6, the blades 104 and 106 and, consequently, the optical refracting elements 112 and 114, assume their position as shown in FIG. 10. When in this position, the optical refracting surfaces of optical elements 112 and 114 are arranged to add dioptric power to the power of the doublet lens so that the combination of the optical refracting elements 112 and 114 and the doublet lens focuses for a predetermined nearby object.

At a predetermined intermediate position of the blade elements 68 and 70, i.e., between their arrangements shown in FIG. 2 and FIG. 4, there is a predetermined position of the blade elements 104 and 106 such that the surfaces of the optical refracting elements 112 and 114 are arranged so that they provide no dioptric power at all. This position is illustrated diagrammatically in FIG. 9. When the blades 104 and 106 are in this position, the optical system 48 of the camera 10 is arranged to focus at a predetermined finite object distance because of the optical action of the doublet lens alone.

In displacing from the arrangement of FIG. 4 to that of FIG. 2 at the commencement of one exposure interval, the inertial member 116 does not decouple from the walking beam 58 and the optical elements 114 and 116 displace in a synchronous manner with the blade elements 68 and 70.

Having described in general terms the manner in which the displacement of the exposure blade apparatus of the present invention can be transmitted to the optical elements 112 and 114 via a mechanical coupling arrangement to displace the optical elements 112 and 114 across the optical axis, $OA_1$, of the camera 10 to change the focus of the camera optical system 48, the manner in which the apparatus of the present invention can be incorporated into a well-known arrangement for flash photography so that the camera optical system 48 focuses a predetermined subject distances for predetermined sizes of the exposure aperture provided by the camera shutter blade apparatus will now be described.

A type of camera exposure control apparatus for use in illuminating a subject to be photographed with an electronic flash and with which the apparatus of the present invention is particularly useful is described in U.S. Pat. No. 4,188,103 issued to Conrad H. Biber et al. on Feb. 12, 1980 and entitled "Range Synchronized Flash Photographic Apparatus And Method For Achieving Optimum Flash Exposure". In the Biber et al. patent a scanning-type shutter blade arrangement is employed in conjunction with a rangefinder employing a sonic detector such as that designated at 46 and an electronic flash such as that designated at 44. Here, the rangefinding system determines a timed interval that is proportionally related to the subject range and the scanning shutter blade arrangement begins exposing the film through increasing aperture values whose rate of increasing area is correlated to the time interval. A pulse of illumination is provided by the electronic flash thereof, following initiation of the exposure cycle, after a period that is related to the timed interval so that the illumination pulse is synchronized with an aperture value, or small range of aperture values, selected in accordance with subject range to provide the proper exposure for the subject range. Because the duration of the electronic flash is short in comparison to the time required for the shutter blade mechanism to scan from its scene light blocking arrangement to its maximum exposure aperture defining arrangement, the aperture defined by the shutter blade elements at the instant of flash illumination for practical purposes constitutes the effective aperture by which the exposure occurs.

Figure 11:
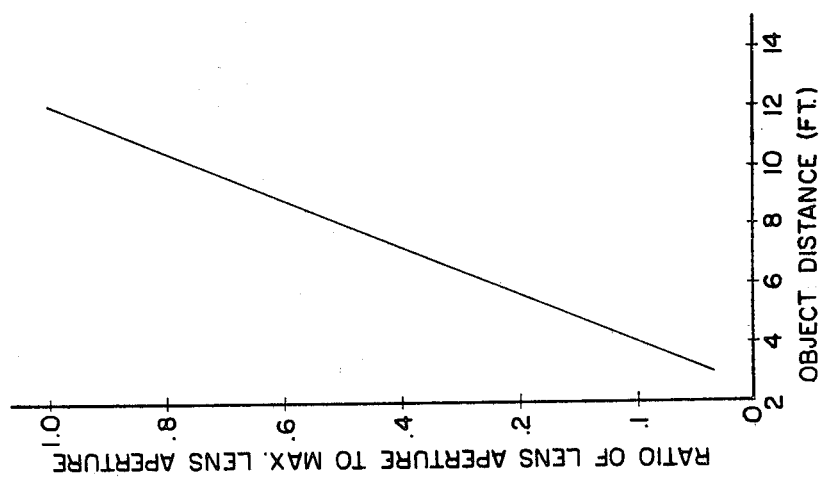
FIG. 11 is a graph showing in normalized fashion the variation in follow focus exposure aperture as a function of object or subject distance.

In order to utilize the present invention in conjunction with a system of the Biber et al. type, it is necessary to first determine the aperture areas required to properly expose subjects located at different distances for the particular film speed and flash output to be utilized. The relationship between the object or subject distances and the aperture areas required at those distances to provide adequate film exposure for a given film speed and electronic flash output may be determined in a well-known manner. Such a relationship is shown in FIG. 11 and illustrates how large the lens aperture area should be in relation to the maximum lens aperture areas possible as object distance changes in order to maintain correct film exposure. In general, this relationship will closely approximate an inverse square law, but the absolute aperture areas required for a particular system will change, of course, based on the film speed and electronic flash output and, perhaps, other considerations such as room effects.

Figure 12:
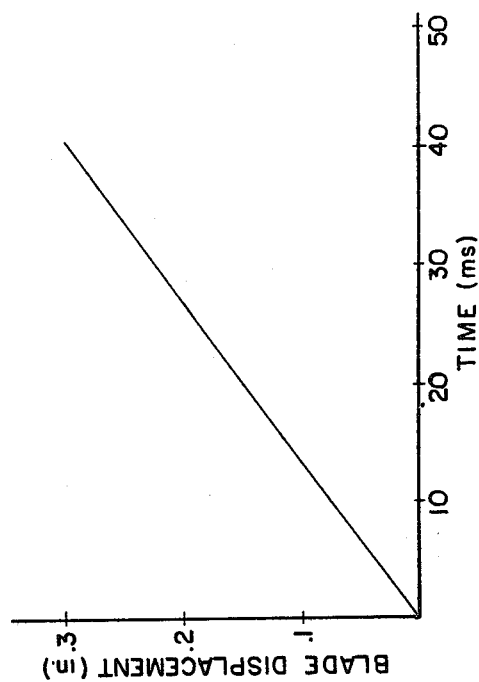
FIG. 12 is a graph showing the displacement of certain blades of the invention with time.

It is also necessary to determine the rate at which the blades 68 and 70 move with respect to one another out of their blocking arrangement (as illustrated in FIG. 4) after the solenoid 60 is deenergized. The shutter blade displacement rate depends on the dynamic characteristics of the shutter blade arrangement and once the rate is established, it can be assumed to be repeatable. The rate at which the blades 68 and 70 displace with respect to one another is shown in exemplary fashion in FIG. 12. Based on the blade displacement rate and the determination of particular exposure aperture sizes for particular object distances, the shape of the primary blade apertures 80 and 82 can be established so that, at substantially all times during the opening of the blades 68 and 70, there are provided predetermined aperture sizes which are appropriate for predetermined object distances.

Having established the relationship between shutter blade displacement and aperture size, the optical parameters of the optical refracting elements 112 and 114 may then be determined in a manner as described in the aforementioned Alvarez and Baker patents. The overall size of the optical refracting elements 112 and 114 may be first established. Thereafter, the amount by which the optical elements 112 and 114 need to be displaced relative to one another across the optical axis, $OA_1$, can be calculated to establish the appropriate dioptric power that is either added to or subtracted from the dioptric power of the doublet lens to properly focus a scene to be photographed for different object distances. This relationship is presented diagrammatically in FIG. 13 which indicates the displacement for each optical element 112 and 114 across the optical axis, $OA_1$, for various object distances so that the optical system 48 of the camera 10 will be properly focused for those object distances.

Figure 14:
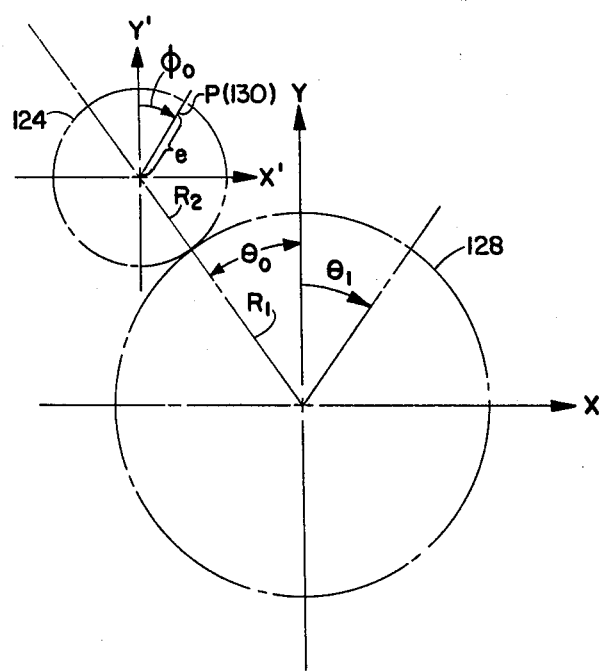
FIG. 14 is a diagrammatic drawing showing certain geometric relationships between various parts of the invention.

Having established the aperture sizes required to appropriately expose subjects at different distances as a function of the displacement of the blades 68 and 70 from their blocking arrangement shown in FIG. 4 and the displacement of the optical elements 112 and 114 to properly focus subjects at the object distances for which the apertures provided by the blades 68 and 70 occur, the various parameters of the epicyclic gear arrangement for coupling the motion of the blades elements 68 and 70 to the optical element 112 and 114 via their mounting arrangement is established from the following equation wherein the various parameters are illustrated in FIG. 14.

$$X_p = (R_1+R_2)\sin\theta_1 - (R_1+R_2)\sin\theta_0 + e\sin(\phi_0+(R_1/R_2)(\theta_1-\theta_0)) - e\sin\phi_0$$

In this equation, $X_p$ is the linear displacement of the eccentric pin 130 located on the gear 124 as measured in the X-Y coordinate system, positive X to the right. $R_1$ is the radius of the fixed gear segment 128, $R_2$ is the radius of the rolling gear 124, and e is the eccentric distance between the location of the pin 130 and the center of rotation of the gear 124. Walking beam 58 connects the centers of the gear segment 128 and the rolling gear 124. $\phi_0$ is the initial angular displacement of the eccentric pin 130 as measured in the X'-Y' coordinate system as shown and $\theta_0$ is the initial angular displacement of the walking beam 58 as measured with respect to the X-Y coordinate system. $\theta_1$ represents the angular displacement of the walking beam 58 in the X-Y coordinate system.

Figure 13:
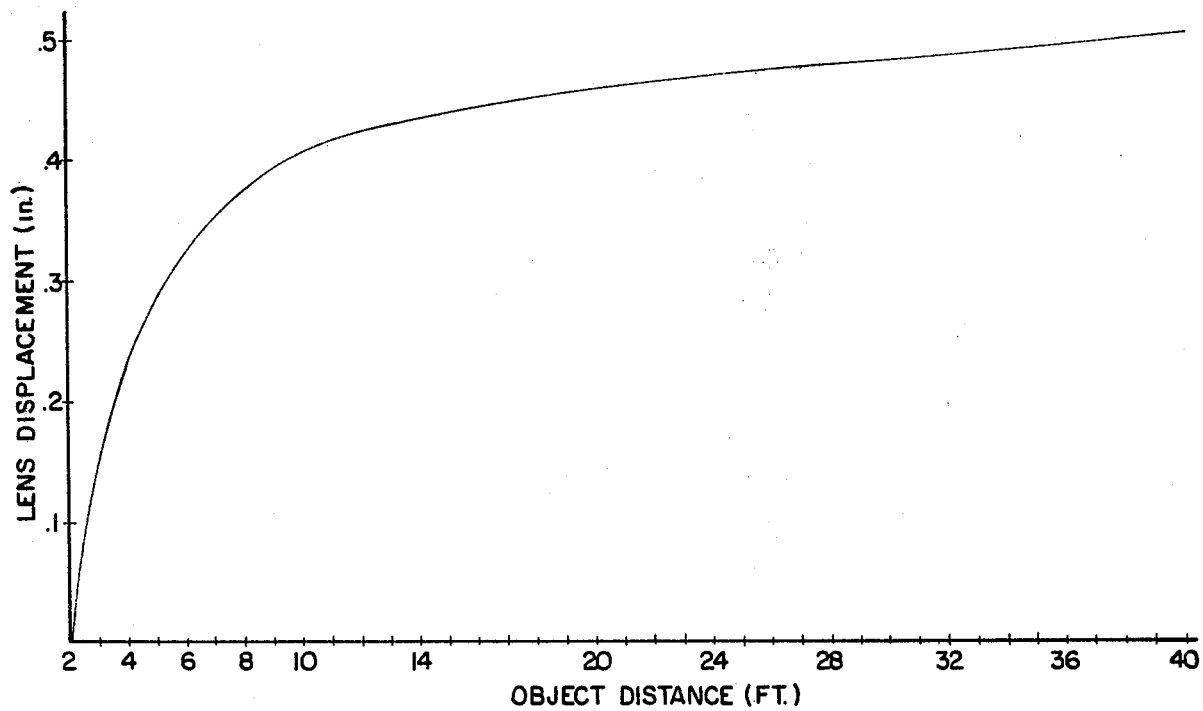
FIG. 13 is a graph showing how certain optical lens elements of the invention displace to properly focus objects or subjects located at various distances away from the camera of FIG. 1.

Utilizing this equation, the parameters thereof are adjusted so that $X_p$ closely approximates the required displacement of the lens elements 112 and 114 to properly focus for different object distances as illustrated by the curve presented in FIG. 13. The cam slot 132 is provided as a means of adjusting the output of the eccentric pin 130 in the event that fine adjustments are required to assure that the lens displacement function presented in FIG. 13 is conformed with.

In the foregoing manner, means for coupling the optical refracting elements 112 and 114 with the shutter blade apparatus of the invention have been provided so that the optical system 48 of the camera 10 changes focus in a predetermined manner by responding to displacement of the blade apparatus between first and second arrangements illustrated, respectively, in FIGS. 4 and 2. The coupling means which comprises an epicyclic gearing arrangement, and the blade apparatus cooperate so that the camera optical system 48 focuses at predetermined subject distances for predetermined sizes of the exposure aperture provided by the blade apparatus. Through the use of the system described in the aforementioned U.S. patent to Biber et al., the electronic flash 44 is fired at a predetermined time interval after the initiation of the exposure cycle which interval is established via a sonic ranging system which includes the sonic transducer 46. The predetermined time interval, as described in the Biber et al. patent is related to the distance by which the subject is separated from the camera. Thus the electronic flash 44 is fired at a particular time related to subject distance after initiation of an exposure cycle and therefore the camera 10 illuminates the subject when the appropriate aperture size over the camera optical path has been established and at the instant when the optical referring elements 112 and 114 are properly displaced to focus at that object distance.

The apparatus of the invention may also be used in an ambient exposure mode of operation in which the electronic flash 44 is not operative. Here the exposure interval is under the control of a well-known integrating arrangement which utilizes the optical element 52 and the photodetector 88 as a means for evaluating the brightness of the scene to provide an output which terminates the exposure interval as a function of scene brightness. At high levels of ambient scene brightness, the aperture provided by the blades 68 and 70 will generally be quite small and the displacement of the optical elements 112 and 114 will also be quite small and be positioned to appropriately focus for nearby objects. However, because the aperture is so small, the depth of field will be quite large and, therefore, most subjects should be adequately sharp even though they may be distant from the camera 10.

When the ambient scene brightness is quite low, the aperture provided by the blades 68 and 70 will be large and the displacement of the optical elements 112 and 114 will also be quite large, focusing for distant objects. For intermediate ambient scene brightnesses, the aperture provided by the blades 68 and 70 will be of intermediate size and the optical elements 112 and 114 will be positioned so that their dioptric power contribution to the optical system 48 of the camera 10 will be close to 0 and therefore the camera 10 will be focused at the hyperfocal distance provided by the doublet lens of the optical system 48.

Certain changes may be made in the above-described embodiment without departing from the scope of the invention and those skilled in the art may make still other changes according to the teachings of the present invention. Therefore, it is intended that all matter contained in the above description or shown in the accompanying drawings shall be interpreted as illustrative and not in a limiting sense.

What is claimed is:

1. Photographic camera apparatus for use in a camera of the type having means for facilitating the positioning of film in a plane for exposure and an optical path along which light from a scene can travel to expose the film, said apparatus comprising:

blade apparatus;

means for mounting said blade apparatus for displacement between a first arrangement in which said blade apparatus blocks scene light from traveling along the camera optical path thereby precluding scene light from reaching the film plane and a second arrangement in which said blade apparatus unblocks the camera light path, said blade apparatus being structured to define an aperture, aligned with the camera optical path, which varies in size in a predetermined manner during displacement of said blade apparatus between its first and second arrangements, drive means actuable for displacing said blade apparatus between its first and second arrangements to define an exposure interval;

variable focus optical means structured to continuously focus scene light from a predetermined range of subject distances onto the film plane, said optical means comprising a pair of optical elements having refractive surfaces configured such that changes in focus are effected by displacing said elements relative to one another in a direction transverse to the optical axes of said elements;

means for mounting said optical refractive elements for movement relative to one another transverse to the camera optical path between a first arrangement corresponding to said first arrangement of said blade apparatus and a second arrangement corresponding to said blade apparatus second arrangement; and an epicyclic gear train for driving at least one of said optical elements in response to displacement of said blade apparatus so that said optical elements change focus in a predetermined manner during displacement of said blade apparatus between its first and second arrangements, said epicyclic gear train being structured so that said optical elements move in correspondence with said blade apparatus to focus at predetermined subject distances for predetermined sizes of said blade apparatus aperture.

2. The apparatus of claim 1 wherein said blade apparatus comprises a pair of elongated, thin opaque blade elements which are generally rectangular in shape, said blade elements being mounted for counter-reciprocating motion with respect to one another and each having an aperture of predetermined size and shape therein located so that, when said blade apparatus is in its first arrangement, said blade apertures are misaligned with one another and opaque portions of said blade elements block the camera light path and, as said blade apparatus is displaced between its first and second arrangements, said blade element apertures progressively overlap one another and become aligned with the camera optical path to define said varying sized aperture in alignment with the camera light path and wherein said means for mounting said optical refracting elements comprises another pair of thin, elongated blade elements mounted for counter-reciprocating motion with respect to one another in planes generally parallel with the planes in which said blade apparatus blade elements move and wherein said optical refracting elements are fixedly mounted on said other blade elements for movement therewith.

3. The apparatus of claim 2 wherein said other blade elements are also generally rectangular in shape, are mounted for movement in directions parallel to their elongated dimension, transverse to the camera optical path, and generally in the same direction in which said blade apparatus blade elements move.

4. The apparatus of claim 3 wherein said blade apparatus mounting means includes a beam element pivotally mounted for rotation and wherein said blade apparatus blade elements are slidably pinned to opposite ends of said beam element so that said blade elements move in counterreciprocating fashion as said beam element rotates.

5. The apparatus of claim 4 wherein said epicyclic gear train comprises:
(a) a gear segment of predetermined configuration fixedly mounted with respect to said blade apparatus and said optical elements; and
(b) a circular gear having its center rotatably mounted on said beam element for movement therewith and structured so that its circumferential teeth are engaged with said fixed gear segment to travel around the circumference of said fixed gear segment as said blade apparatus is displaced between its first and second arrangements, said circular gear including an eccentric pin for facilitating movement of at least one of said optical elements to change the focus of said optical elements.

6. The apparatus of claim 5 wherein said means for mounting said optical refracting elements includes a cam adapted for engagement with said circular gear eccentric pin and coupled with at least one of said optical elements to modify and transmit the motion of said eccentric pin to said optical element.

7. The apparatus of claim 1 wherein said epicyclic gear train comprises:
(a) a gear segment of predetermined configuration fixedly mounted with respect to said blade apparatus and said optical elements; and
(b) a circular gear having its center mounted with said blade apparatus mounting means for movement therewith and structured so that its circumferential teeth are engaged with said fixed gear segment to travel around the circumference of said fixed gear segment as said blade apparatus is displaced between its first and second arrangements, said circular gear including an eccentric pin for facilitating movement of at least one of said optical elements to change the focus of said optical elements.

8. The apparatus of claim 7 wherein said means for mounting said optical refracting elements includes a cam adapted for engagement with said circular gear eccentric pin and coupled with at least one of said optical elements to modify and transmit the motion of said eccentric pin to said optical element.

9. Photographic camera apparatus comprising:
a camera housing including means for facilitating the positioning of film in a plane for exposure and an optical path along which light from a scene can travel to expose film;
blade apparatus;

means for mounting said blade apparatus for displacement between a first arrangement in which said blade apparatus blocks scene light from traveling along the camera optical path thereby precluding scene light from reaching the film plane and a second arrangement in which said blade apparatus unblocks the camera light path, said blade apparatus being structured to define an aperture, aligned with the camera optical path, which varies in size in a predetermined manner during displacement of said blade apparatus between its first and second arrangements, drive means actuable for displacing said blade apparatus between its first and second arrangements to define an exposure interval;

variable focus optical means structured to continuously focus scene light from a predetermined range of subject distances onto the film plane, said optical means comprising a pair of optical elements having refractive surfaces configured such that changes in focus are effected by displacing said elements relative to one another in a direction transverse to the optical axis of said elements;

means for mounting said optical refractive elements for movement relative to one another transverse to the camera optical path between a first arrangement corresponding to said first arrangement of said blade apparatus and a second arrangement corresponding to said blade apparatus second arrangement; and an epicyclic gear train for driving at least one of said optical elements in response to displacement of said blade apparatus so that said optical elements change focus in a predetermined manner during displacement of said blade apparatus between its first and second arrangements, said epicyclic gear train being structured so that said optical elements move in correspondence with said blade apparatus to focus at predetermined subject distances for predetermined sizes of said blade apparatus aperture.

10. The apparatus of claim 9 wherein said blade apparatus comprises a pair of elongated, thin opaque blade elements which are generally rectangular in shape, said blade elements being mounted for counter-reciprocating motion with respect to one another and each having an aperture of predetermined size and shape therein located so that, when said blade apparatus is in its first arrangement, said blade apertures are misaligned with one another and opaque portions of said blade elements block the camera light path and, as said blade apparatus is displaced between its first and second arrangements, said blade element apertures progressively overlap one another and become aligned with the camera optical path to define said varying sized aperture in alignment with the camera light path and wherein said means for mounting said optical refracting elements comprises another pair of thin, elongated blade elements mounted for counter-reciprocating motion with respect to one another in planes generally parallel with the planes in which said blade apparatus blade elements move and wherein said optical refracting elements are fixedly mounted on said other blade elements for movement therewith.

11. The apparatus of claim 10 wherein said other blade elements are also generally rectangular in shape, are mounted for movement in directions parallel to their elongated dimension, transverse to the camera optical path, and generally in the same direction in which said blade apparatus blade elements move.

12. The apparatus of claim 11 wherein said blade apparatus mounting means includes a beam element pivotally mounted for rotation and wherein said blade apparatus blade elements are slidably pinned to opposite ends of said beam element so that said blade elements move in counterreciprocating fashion as said beam element rotates.

13. The apparatus of claim 12 wherein said epicyclic gear train comprises:
(a) a gear segment of predetermined configuration fixedly mounted with respect to said blade apparatus and said optical elements; and
(b) a circular gear having its center rotatably mounted on said beam element for movement therewith and structured so that its circumferential teeth are engaged with said fixed gear segment to travel around the circumference of said fixed gear segment as said blade apparatus is displaced between its first and second arrangements, said circular gear including an eccentric pin for facilitating movement of at least one of said optical elements to change the focus of said optical elements.

14. The apparatus of claim 13 wherein said means for mounting said optical refracting elements includes a cam adapted for engagement with said circular gear eccentric pin and coupled with at least one of said optical elements to modify and transmit the motion of said eccentric pin to said optical element.

15. The apparatus of claim 9 wherein said epicyclic gear train comprises:
(a) a gear segment of predetermined configuration fixedly mounted with respect to said blade apparatus and said optical elements; and
(b) a circular gear having its center mounted with said blade apparatus mounting means for movement therewith and structured so that its circumferential teeth are engaged with said fixed gear segment to travel around the circumference of said fixed gear segment as said blade apparatus is displaced between its first and second arrangements, said circular gear including an eccentric pin for facilitating movement of at least one of said optical elements to change the focus of said optical elements.

16. The apparatus of claim 15 wherein said means for mounting said optical refracting elements includes a cam adapted for engagement with said circular gear eccentric pin and coupled with at least one of said optical elements to modify and transmit the motion of said eccentric pin to said optical element.

* * * * *